United States Patent

[11] 3,630,325

| [72] | Inventors | James A. Corl<br>San Carlos;<br>Stephen B. Sprague, San Jose, both of Calif. |
|---|---|---|
| [21] | Appl. No. | 885,427 |
| [22] | Filed | Dec. 16, 1969 |
| [45] | Patented | Dec. 28, 1971 |
| [73] | Assignee | Insul-8-Corp.<br>San Carlos, Calif. |

[54] SUPPORT SYSTEM FOR MOVABLE CONDUCTORS
17 Claims, 8 Drawing Figs.

[52] U.S. Cl. ..................................................... 191/12 C
[51] Int. Cl. ..................................................... H02g 11/00
[50] Field of Search ........................................... 191/12;
29/476, 476.5, 477; 72/369

[56] References Cited
UNITED STATES PATENTS

| 3,284,036 | 11/1966 | Nansel .......................... | 191/12 C |
| 3,332,434 | 7/1967 | Stahmer ....................... | 191/12 C |

FOREIGN PATENTS

| 1,167,630 | 4/1964 | Germany ...................... | 72/369 |

Primary Examiner—Richard E. Aegerter
Assistant Examiner—I. Kenneth Silverman
Attorney—Fowler, Knobbe and Martens ABSTRACT: A segmented plastic tube having integral hinges is folded in two sections joined by a 180° loop and extended between a fixed station and a station movable with a piece of equipment along a predetermined path. Flexible conductors and conduits for providing power and fluids to the equipment extend between the stations and are confined and supported within the tube as the movable station and tube are slid within a supporting housing.

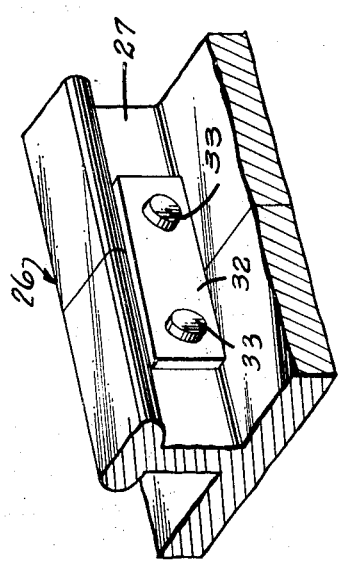
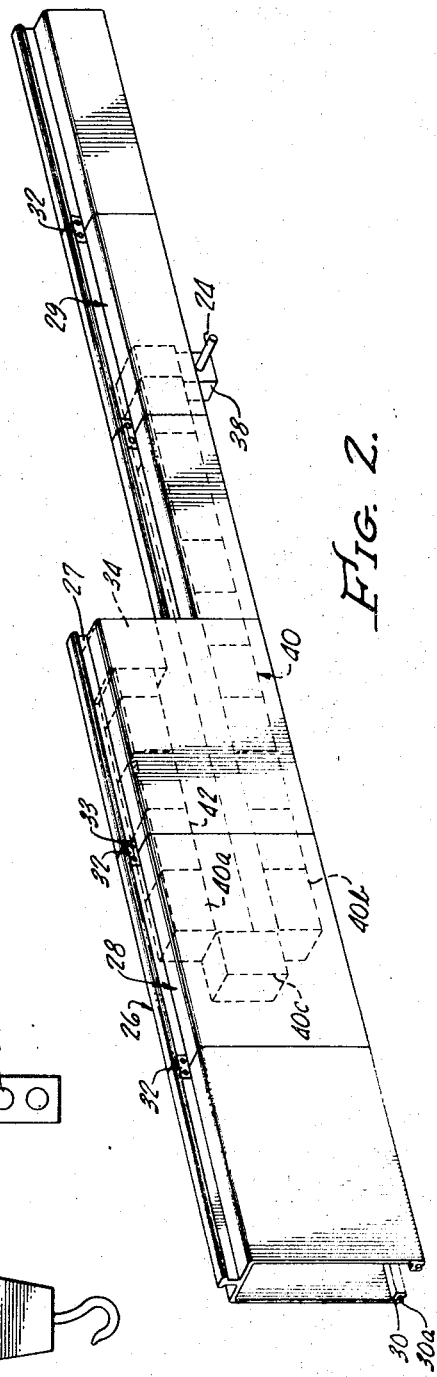
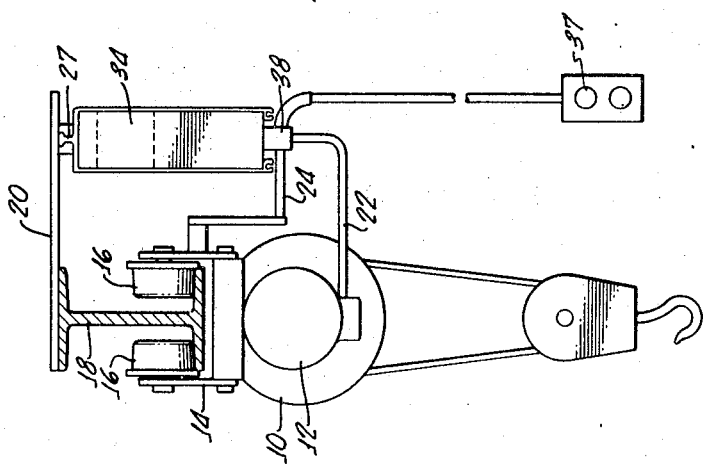
INVENTORS.
JAMES A. CORL
STEPHEN B. SPRAGUE
BY
FOWLER, KNOBBE
& MARTENS
ATTORNEYS.

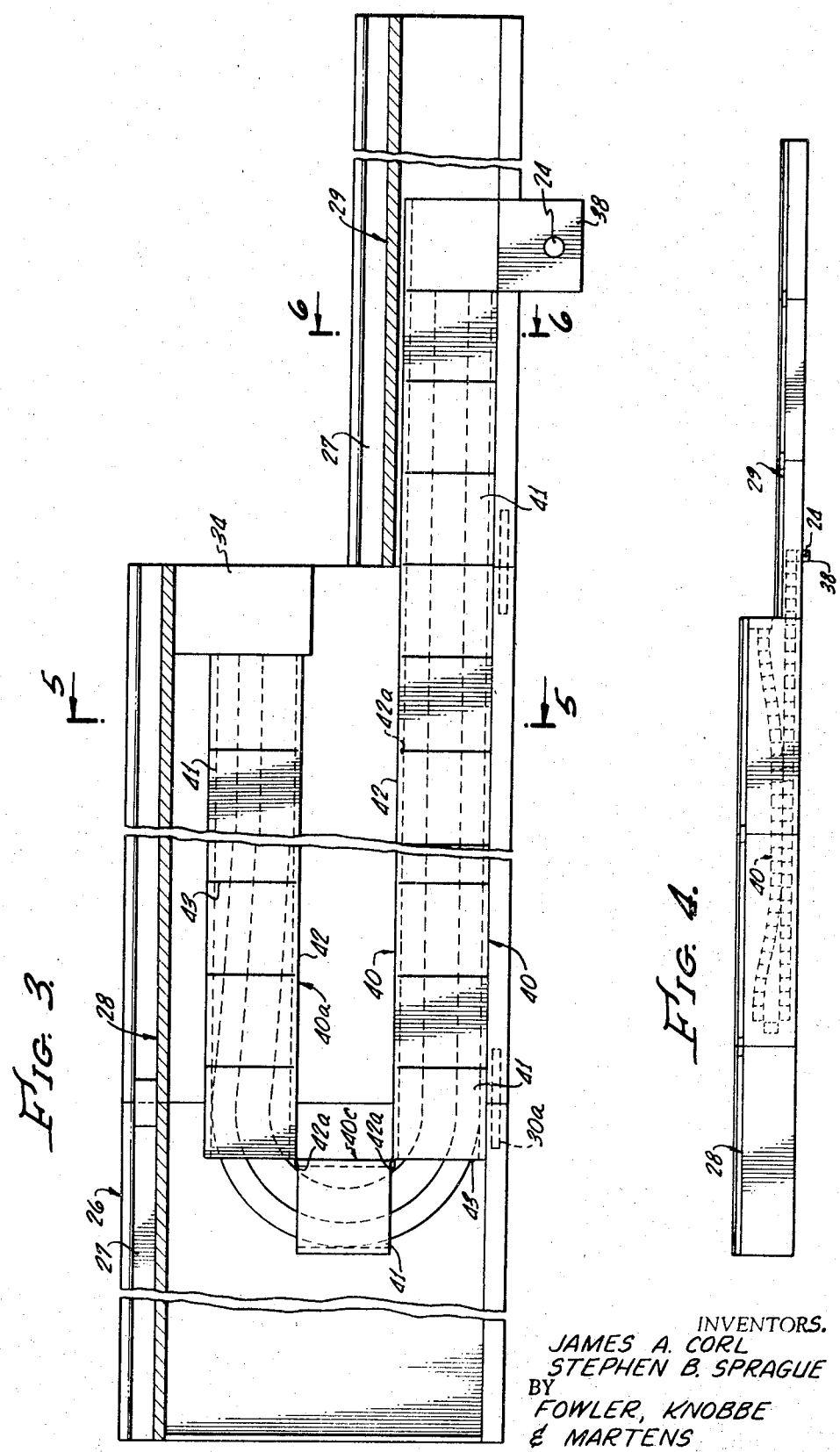

PATENTED DEC 28 1971

INVENTORS.
JAMES A. CORL
STEPHEN B. SPRAGUE
BY FOWLER, KNOBBE
& MARTENS
ATTORNEYS.

SUPPORT SYSTEM FOR MOVABLE CONDUCTORS

This invention relates to a system for distributing electrical power or fluids through flexible cables or conduits to a piece of equipment moving on a predetermined path, and more particularly to an arrangement for supporting and confining the conductors and conduits as they are moved.

A common means for transmitting electrical energy to equipment moving along a given path is to slide a conductive collector shoe along a fixed conductor bar as the equipment is moved. The conductor bar is normally of necessity partially open so that it is accessible to the collector shoe; and while various steps have been made to improve the safety of such open arrangements, there is nevertheless, some hazard involved. Also, in the past such system has been limited to the distribution of electrical energy.

An approach for conducting electric energy, as well as fluids, from a fixed source to movable equipment is to employ flexible cables and conduits. With this system, the portions of the flexible conductors and conduits which are excess when the moving station is close to the fixed station must be protected from damage and they must be supported for overhead operations. To be practical, the system for supporting and protecting the conductors must be both effective and reliable in operation and competitive from a cost standpoint.

In one known system the cable or conduit is supported on reels so that the excess cable is stored on the reel until needed. While this approach has been used with some success, there are certain disadvantages including cost with such an arrangement.

Another approach which has been used is to arrange the flexible conductors and conduits extending between a fixed input station and a movable takeoff station into elongated sections joined by a 180° loop with the conductors or conduits being supported by a variety of movable chain-type link constructions. The excess cable is thus stored in the form of the two sections joined by the loop. This concept is quite functional but has been rather expensive and has never been widely accepted. Thus a need exists for a supporting system which is simple in operation, lightweight but yet strong enough to provide the necessary support while being durable and inexpensive to fabricate, install, operate and maintain.

In accordance with this invention, the cables and conduits are stored in two long sections joined by a 180° loop, and there is provided a segmented tube formed of relatively lightweight rigid material for supporting the cables and conduits. The tube is formed of a series of tube segments hinged together to permit the tube to be folded into two generally longitudinal sections joined by a 180° loop. The flexible conduits, conductors or the like are positioned and confined within the tube for guidance and support. A suitable housing encloses and supports the tube as it is slid within the housing.

In a preferred form of the invention, the tube is extruded with a square cross section of a thin lightweight plastic such as polypropylene or polyallomer. The tube is then transversely cut through three of its walls at longitudinally spaced intervals to form the series of tubular segments. The portions of the uncut side of the tube connecting the tube segments form integral hinges and the uncut side forms the inner wall of the loop. One section of the housing is high enough to accommodate the loop and the other two sections, while an adjoining housing section can only accommodate one section of the tube.

For a more detailed description of the invention, refer to the following detailed description and drawings in which:

FIG. 1 is an end elevational view of the conductor-conduit-supporting system of the invention shown in use with a movable overhead crane;

FIG. 2 is a perspective view of the support system with the tube of the invention shown in broken lines within its protective housing;

FIG. 2a is an enlarged perspective view of a portion of FIG. 2 showing the connection between housing segment;

FIG. 3 is an enlarged elevational view of the support tube positioned within its protective housing shown in cross section and with longitudinal portions broken out;

FIG. 4 is a side elevational view of a system with the housing, height and length being shown more to scale than in FIGS. 2 and 3;

Figure 5:
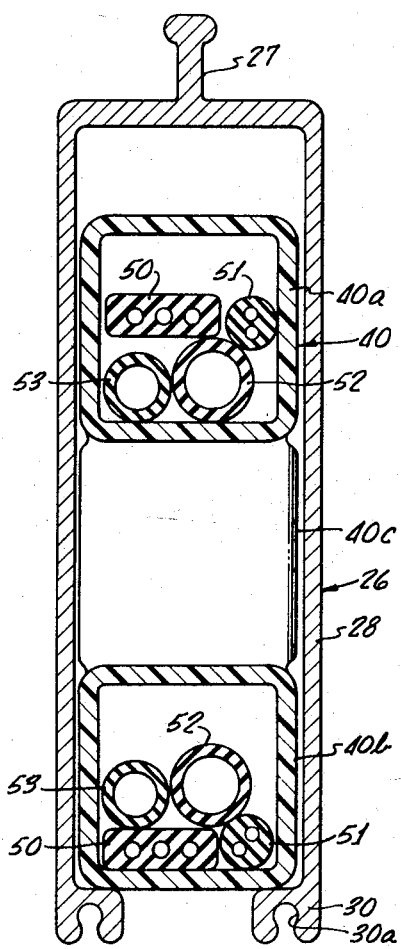
FIG. 5 is a cross-sectional view of the tail portion of the housing showing the tube in cross section as taken on line 5—5 of FIG. 3.

Referring first to FIG. 1, there is shown an overhead crane 10 driven by a motor 12, both of which are supported by a carriage assembly 14 having a pair of rollers 16 mounted for rolling support on an overhead rail 18 attached to a ceiling or raised support surface 20. A conductor 22 provides power to the motor 12 from a movable takeoff box 38 connected to power and fluid sources. The takeoff box is moved along with the crane 10 by means of a tow bar 24 extending outwardly from the crane carriage assembly 14. A control box 37 is shown connected to the takeoff box 38.

Referring now to FIGS. 2–5 as well as FIG. 1, there is shown a housing 26 attached to the overhead support surface 20 by means of an upwardly extending rib 27 formed on the housing. The housing extends in length for a distance approximately equal to the path through which the overhead crane 10 will be traveling. As viewed in FIGS. 2, 3 and 4, the housing 26 includes a left, tall section 28 which extends approximately half the total housing length and a right short section 29 which extends the other half of the total housing and which is axially aligned with the lower portion of the tall section so that together a continuous track is formed in the lower portion of the housing. The short right section 29 also has a rib 27 for attachment to a support.

The housing 26 is preferably formed of a series of housing segments, each of which are preferably extruded as single elements and then joined by suitable means at the site they are to be used. For this purpose there is formed at the lower wall of the housing, a pair of inwardly extending lips or lugs 30 having a longitudinal hole 30a formed therein. In assembly a suitable knurled pin 31 is driven in the hole in each of the lugs of one segment and the opposite end of the pin is received within the aligned hole in the lug of the adjacent housing segment. The upper portions of adjacent segments are spliced by suitable plates 32 and bolts 33, as seen in FIG. 2a. The housing segments forming the short housing section 29 are formed in a manner similar to the segments in the tall section 28.

Within the upper portion of the tall housing section 28 adjacent the center of the housing which is where the tall section joins the short housing section 29, there is positioned a fixed power and fluid input box 34 which is connected to the sources of power, air, etc.

Within the housing 26 there is positioned an elongated thin walled tube 40 which, as may be seen in FIGS. 2, 3 and 4, is connected to the input box 34 and to the takeoff box 38 with the tube folded on itself into an upper section 40a and a lower section 40b joined by a 180° loop generally indicated by 40c. The upper and lower sections 40a and 40b are of variable length as the takeoff box 38 is pushed or pulled, causing the tube 40 to be slid along the supporting lugs 30 in the lower wall of the housing.

The tube 40 is preferably formed of a lightweight material which is strong and rigid such as polypropylene or polyallomer. This material is also relatively inexpensive, may be extruded easily and is quite durable. In fabrication, a tube of the desired cross-sectional shape is extruded with conventional equipment (not shown) into the desired length and is then transversely cut such as with a conventional power saw (not shown) at longitudinally spaced intervals through three of its walls to thus form a series of tube segments 41 interconnected by the uncut wall 42. The walls are sufficiently thin such that intersections 42a between adjacent segments thus form flexible hinges which permit the tube to be folded on itself as shown. In looking at the upper section 40a of the tube, the top and sidewalls of the tube have been cut so that the segments 41 formed thereby are joined by the bottom uncut wall 42. In passing through the loop area 40c, the uncut wall becomes the top wall of the lower section 40b.

Figure 7:
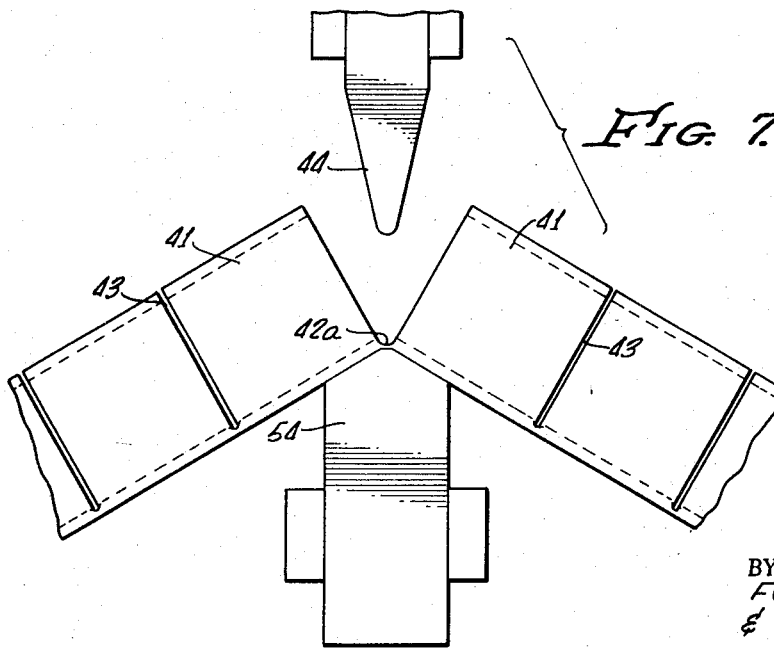
FIG. 7 is an elevational view showing one step in the fabrication of the tube.

Initially the cuts 43 are preferably of a width of approximately three sixty-fourths of an inch, and hence the hinge portions 42a of the wall 42 are initially of this width. However, to improve the durability of such hinges, they are thinned an additional amount by being pressed cold or with a heated die. This operation is shown in FIG. 7 where a strip heater 44 is engaging a hinge 42a placed over a suitable anvil 45. After it is thinned, the hinge 42a has a thickness of about 0.010 inches and a flat width of about one-sixteenth of an inch. This of course, makes the cuts or spaces 43 between the other walls of the segments about one-sixteenth of an inch.

In a preferred example of the invention, the tube has approximately a square cross section with a width of about 2 inches and a wall thickness of about one-eighth of an inch. The corners of the tube are smoothly rounded on a radius of about one-eighth of an inch.

Figure 6:
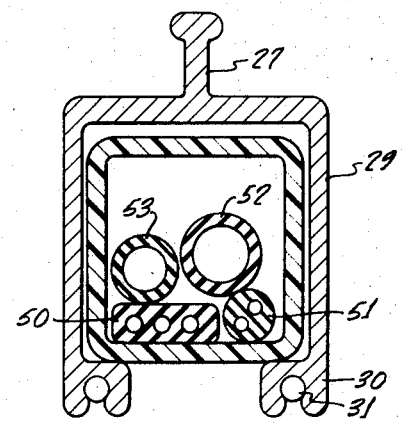
FIG. 6 is a cross-sectional view on line 6—6 of FIG. 3 through the short section of the housing.

The spacing between saw cuts, which determines the length of the tube segments, is a matter of design to fit the desirable radius of curvature of the cables and conduits to be confined within the tube. As may be seen in FIGS. 2 and 3, the tube is shown going through the loop section 40c with a single tube segment 41 in a vertical position while the two adjoining tube segments are still horizontal. Thus, the length of a tube segment plus the cross-sectional height of the tube determines the radius through which the conduits and conductors must bend. In a preferred arrangement, the segments are approximately 2 inches long. Thus, adding the length of the segment to the cross-sectional height of the tube at the top and the bottom, and allowing for a certain tolerance, it is necessary that the height of the high housing section 28 be slightly more than 6 inches or about 6½ inches. As may be seen from FIG. 5, the width of the housing is slightly larger than the 2 inch tube. Referring to FIG. 6 it may be seen that the cross section of the lower housing portion 29 is square and slightly greater than the cross section of the tube.

The tube 40 is adapted to loosely receive a plurality of conductors, conduits or the like. By way of illustration, there is shown in FIGS. 5 and 6, a flat flexible electrical cable 50 having embedded therein a plurality of conductors, an electrical cable 51 of circular cross section having a pair of conductors embedded therein, a large diameter conduit 52 which may carry, for example, water or hydraulic fluid and a smaller diameter flexible conduit 53 which may carry for example pressurized air. It should be understood that each of these conduits and cables is connected to the fixed input box 34 which in turn leads to a source of supply for the fluid or energy and the opposite end of the cables or conduits is connected to the movable takeoff box 38 where suitable connections (not shown) may be provided to duct the fluid or energy to the moving machinery.

The portion of the tube forming the 180° loop 40c is selected to accommodate the radius of curvature of the flexible cable and conduits 50–53. Thus, the tube together with the cables or conduits are essentially self-supporting, as they pass through the loop 40c. The loose arrangement of conduits and cables within the tube permit them to slide relative to one another in amounts sufficient to insure smooth movement through the loop 40c. With the uncut side of the tube forming the inner wall of the tube loop, the upper section 40a of the tube can sag downwardly as shown in FIG. 4, with the maximum sag occurring midway between the fixed input box 34 and the loop 40c. As the tube sags, the upper edges of adjacent tubes engage each other so that the amount of sag is limited, but with a long span of tube, the upper section may sag to engage an upper wall of the lower section. This is quite acceptable in that it is simply one portion of the uncut side engaging another portion of the uncut side of the tube so that there are no snags or interruptions to interfere with the movement of the tube. Instead, the tube sections can simply slide relative to each other. The lower tube section 40b is, of course, supported throughout its entire length by the inwardly extending lugs 30.

When the movable takeoff box 38 is moved by means of the tow bar 24, the enclosed cables and conduits simply move accordingly. If the takeoff box is pulled, relatively little supporting action is required by the tube 40 in that the cables and conduits tend to naturally move as directed and move smoothly through the loop area 40c. However, when the takeoff box is pushed so as to push more cable and conduit, together with the tube, into the upper section 40a, the tube 40 serves a more vital function in that the tube receives the axial pushing force so as to maintain the cables and conduits in a straight untangled arrangement. Without the tube, the cables and the conduits would likely become tangled and jammed so that the system would not continue to function properly. It is possible that the segmented tube may buckle upwardly. However, those portions of the tube which are in the shorter housing section 29 are confined by the housing, whereas those portions in the taller section are limited in the amount of buckling which can occur in that the upper and lower sections 40a and 40b of the tube will engage each other. This limited amount of misalignment is entirely permissible without adverse effects.

It should be understood that in addition to being installed as shown and described above, the entire system can be installed on its side or upside down.

What is claimed is:

1. A protective support for flexible conduits, conductors, or the like for delivery of services such as electric power, compressed air, liquid and the like to a part moving in a guided path comprising:

a tube made of lightweight relatively rigid material, which tube includes a series of tube segments connected by hinge means which permit the tube to be moved through a 180° loop, said conduits, conductors or the like being positioned within the tube for guidance and support; said tube being continuous and having transverse cuts at longitudinally spaced intervals except through said one wall so that said hinge means are the intersections between said tube segments.

2. The protective support of claim 1 wherein said intersections are thinner than the tube wall.

3. The support of claim 1 wherein said tube is made of a suitable plastic material such as polypropylene or polyallomer.

4. A system for confining and guiding flexible conduits, conductors or the like between a pair of relatively movable stations comprising:

a plastic tube including a series of tube relatively rigid segments joined by integral hinge means on one side of the tube permitting the tube to be formed into two sections joined by a 180° loop with the hinged side forming the inner wall of the loop, the sections being variable in length as the relative position of said stations changes; and a housing supporting said tube.

5. The system of claim 4, wherein said tube has a generally rectangular cross section with rounded corners and with walls about one-eighth inch thick.

6. The system of claim 4, wherein said tube is oriented so that one tube section is on top and the other tube section is on the bottom, said housing is an elongated member partially enclosing substantially the entire tube, said fixed station is attached to the end of the top tube section and is positioned in the upper portion of the housing in approximately the longitudinal center of the housing, and said movable station is located in the lower portion of the housing attached to the other end of the tube, said bottom tube section sliding on said housing and said top tube section being supported by the tube loop and the fixed station while the portion of the tube between the fixed station and the loop is either self-supporting or sags unto the bottom tube section.

7. The system of claim 6, wherein said housing includes a tall section, which is slightly taller than twice the cross-sectional height of the tube plus the length of one tube segment so as to accommodate the loop, and the width of the tall section is slightly greater than the width of the tube.

8. A system for confining and guiding flexible conduits, conductors or the like between a pair of relatively movable stations comprising:

a tube made of relatively lightweight rigid material, the tube including a series of tube segments joined by a substantially flat wall integral with the segments, thus permitting the tube to be divided into two sections joined by a 180° loop with said flat wall forming the inner wall of the loop, the sections being variable in length as the relative position of said stations changes; and a housing supporting said tube;

said tube being oriented so that one tube section is on top and the other tube section is on the bottom, said housing is an elongated member partially enclosing substantially the entire tube, said fixed station is attached to the end of the top tube section and is positioned in the upper portion of the housing in approximately the longitudinal center of the housing, and said movable station is located in the lower portion of the housing attached to the other end of the tube, said bottom tube section sliding on said housing and said top tube section being supported by the tube loop and the fixed station while the portion of the tube between the fixed station and the loop is either self-supporting or sags unto the bottom tube section; and said housing having a top wall, sidewalls and means defining a pair of inwardly extending lips at its bottom for supporting the tube and defining a gap through which power can be taken from said movable station.

9. A system for confining and guiding flexible conduits, conductors or the like between a pair of relatively movable stations comprising:

a tube made of relatively lightweight rigid material, the tube including a series of tube segments joined by a substantially flat wall integral with the segments, thus permitting the tube to be formed into two sections joined by a 180° loop with said flat wall forming the inner wall of the loop, the sections being variable in length as the relative position of said stations changes; and a housing supporting said tube;

said tube being oriented so that one tube section is on top and the other tube section is on the bottom, said housing is an elongated member partially enclosing substantially the entire tube, said fixed station is attached to the end of the top tube section and is positioned in the upper portion of the housing in approximately the longitudinal center of the housing, and said movable station is located in the lower portion of the housing attached to the other end of the tube, said bottom tube section sliding on said housing and said top tube section being supported by the tube loop and the fixed station while the portion of the tube between the fixed station and the loop is either self-supporting or sags unto the bottom tube section;

said housing includes a tall section, which is slightly taller than twice the cross-sectional height of the tube plus the length of one tube segment so as to accommodate the loop, and the width of the tall section is slightly greater than the width of the tube; and said housing includes a short section attached to the center end of said tall section with the lower wall of the tall and short sections being horizontally aligned, the cross section of the lower section being slightly greater than the cross section of the tube.

10. The system of claim 9 wherein said housing is formed by a plurality of longitudinal segments which are spliced at their ends to form a continuous housing.

11. The system of claim 10, wherein said housing segments include a pair of lugs extending from the housing near the ends of the housing segments, said lugs having bores formed therein parallel to the longitudinal direction of the housing, and including pins for extending into bores of adjacent segments of housing to connect and align the adjacent segments.

12. The system of claim 10, wherein said housing segments are formed with a top wall, sidewalls, and a pair of lugs formed on the lower ends of said sidewalls and including portions which extend inwardly from the sidewalls to define a lower support surface and a gap between the lugs, said lugs having longitudinal bores therein for receiving pins for connecting adjacent housing segments.

13. A system for distributing electrical energy or fluid through a group of movable flexible conduits or conductors comprising:

an elongated housing having a short section and a tall section, the sections being aligned in end-to-end relation with means on their lower portions defining a continuous support path;

a fixed input box positioned within the tall section near the center of the housing;

a power takeoff box mounted to be longitudinally movable within the housing on said support path and having a tow bar extending outwardly through a slot in the housing so that the takeoff box may be moved by equipment adjacent to the housing which will be receiving an output through the movable takeoff box; and an elongated, articulated, relatively rigid tube having one end attached to the fixed input box and its other end attached to the movable takeoff box with the tube having an upper section which moves within the upper portion of the tall section of the housing and a lower tube section which moves along said path within the lower portion of the tall housing section and within the short housing section, the tube sections being joined by a loop of approximately 180° extending between the upper and lower portions of the tall housing section, the upper and lower tube sections being variable in length as the movable station is moved within the housing, the tube having a cross section of sufficient size to loosely receive and guide one or more of said flexible conduits or conductors.

14. The system of claim 13 wherein:

the tube is made of a relatively rigid, thin walled plastic material having a rectangular cross section, the tube having a plurality of transverse cuts which divide the tube into a series of segments joined by the flat wall of the tube which is the inner wall of the loop;

the height of the tall housing section is slightly greater than twice the height of the tube cross section plus the length of one of said tube segments, and the low section of said housing has a cross section slightly greater than the cross section of the tube so that the tube is confined within the housing.

15. An article of manufacture comprising an articulated thin walled tube including a series of tube segments joined by hinges integral with the segments.

16. The article of claim 15 wherein the tube has a rectangular cross section and the hinges extend across one wall of the tube.

17. The method of making a support and guide for flexible cables or conduits arranged in two longitudinal sections and joined by a 180° loop and connected to two relatively movable stations comprising:

extruding a thin walled lightweight, elongated tube made of plastic and having at least one flat wall;

making transverse cuts through said tube except for said one wall at longitudinally spaced intervals to form a series of tube segments joined by the uncut portions which serve as hinges and permit said tube to be folded on itself into two sections joined by a 180° loop portion with the flat wall forming the inner wall of the loop; and connecting the tube to said stations with the cables or conduits positioned therein.

* * * * *